United States Patent [19]

Brown

[11] 4,313,167

[45] Jan. 26, 1982

[54] THRUST CONTROL SYSTEM FOR A GAS TURBINE ENGINE

[75] Inventor: Harold Brown, Cincinnati, Ohio

[73] Assignee: General Electric Company, Cincinnati, Ohio

[21] Appl. No.: 61,778

[22] Filed: Jul. 27, 1979

[51] Int. Cl.³ .............................................. F02K 3/00
[52] U.S. Cl. ................................. 364/431.02; 60/223; 60/243
[58] Field of Search ............. 364/431; 235/302, 302.2; 60/39.03, 39.24, 39.28 R, 39.28 J, 223, 243; 244/178

[56] References Cited

U.S. PATENT DOCUMENTS

| | | | |
|---|---|---|---|
| 3,813,063 | 5/1974 | Martin | 60/39.28 R |
| 3,846,760 | 11/1974 | Ironside | 364/431 |
| 3,854,287 | 12/1974 | Rembold | 60/243 |
| 3,987,620 | 10/1976 | Giordano et al. | 364/431 |
| 4,032,757 | 6/1977 | Eccles | 364/431 |
| 4,104,876 | 8/1978 | Larsen et al. | 60/39.28 R |
| 4,136,517 | 1/1979 | Brown | 60/223 |
| 4,158,884 | 6/1979 | McKinley et al. | 364/431 |
| 4,159,625 | 7/1979 | Kerr | 364/431 |

Primary Examiner—Errol A. Krass
Attorney, Agent, or Firm—Donald W. Walk; Derek P. Lawrence

[57] ABSTRACT

An improved thrust control system is provided for controlling thrust output of a gas turbine engine in a manner which automatically compensates for engine deterioration and corresponding changes in engine performance. The system is further adapted to control the thrust output with at least a pair of thrust-indicating parameters, such as engine speed and temperature.

9 Claims, 2 Drawing Figures

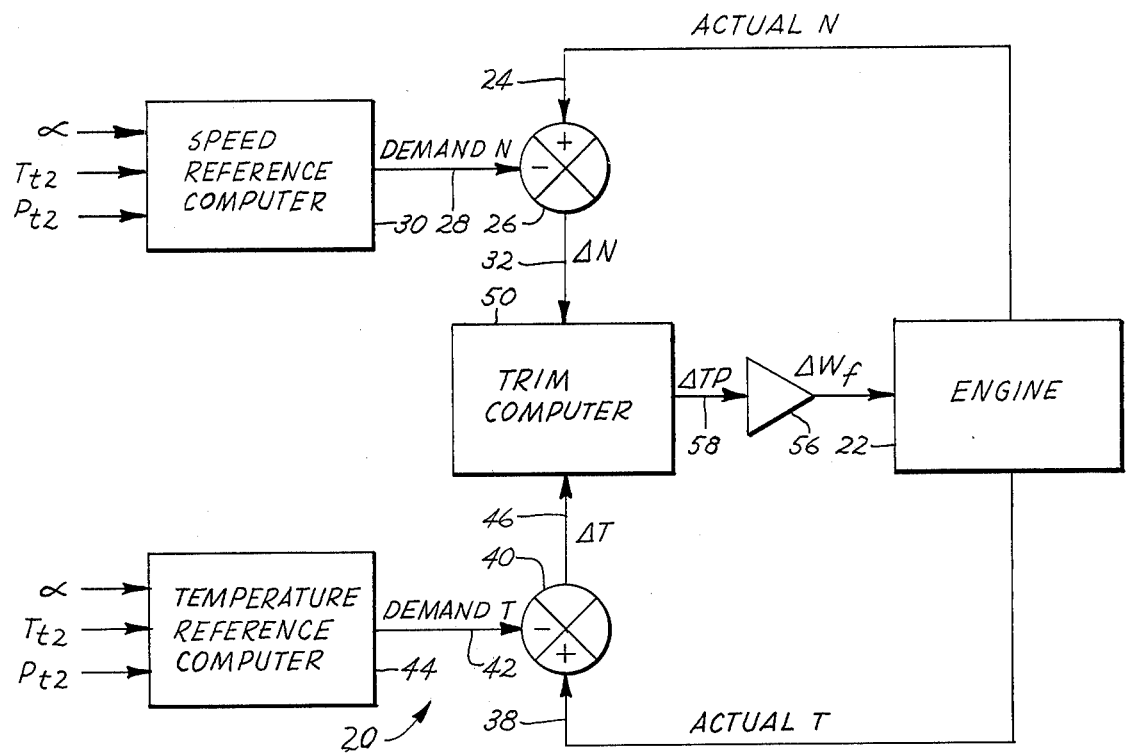
_Fig 1_
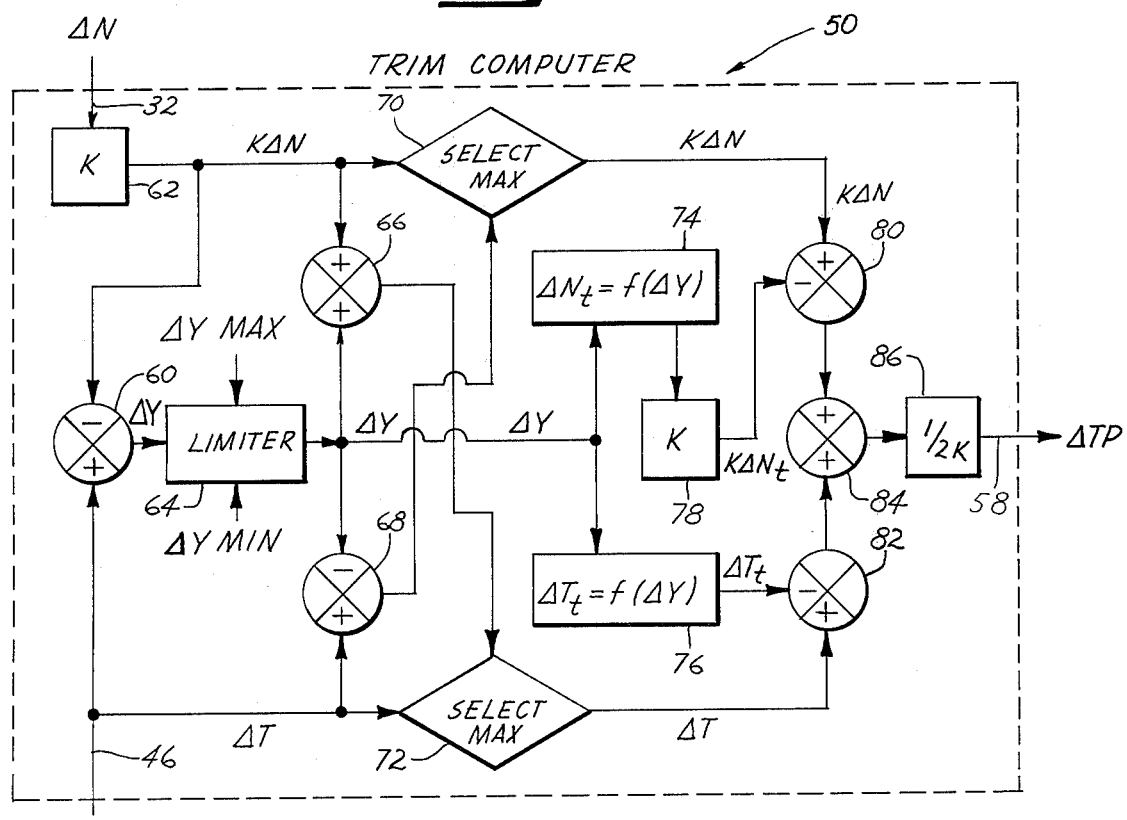
_Fig 2_

4,313,167

THRUST CONTROL SYSTEM FOR A GAS TURBINE ENGINE

BACKGROUND OF THE INVENTION

1. Field of the Invention

This invention relates to an improved system for controlling thrust output of a gas turbine engine and, more particularly, to such a system which automatically adjusts the thrust output to compensate for changes in the engine due to aging.

2. Description of the Prior Art

One of the main functions of a gas turbine engine control system is to provide for the generation of whatever specific level of thrust is required or demanded by throttle position set by the pilot or engine operator. Due to quality variations, control tolerances and various other factors, no two engines are exactly alike in their operational characteristics. In addition, the operational characteristics of each engine tend to change as the engine ages, and some components deteriorate. Therefore, engine control systems must be designed to function with engines whose operational characteristics vary widely.

In order that such an engine control system is able to function to provide the guarantee on rated thrust level on all engines, it must be designed to control a "minimum" engine; that is, an engine which produces only the minimum rated thrust due to the above described variations. An engine control system which is designed to adequately operate with a "minimum" engine ends up producing excessive thrust levels with "average" or "above average" engines. These excessive thrust levels cause the engines to operate at higher temperatures than would otherwise be necessary to provide rated or desired thrust, thereby potentially decreasing the operating life of the engine. This problem is even further compounded as the engines age, and the thrust output tends to increase even more.

It is, therefore, an object of the present invention to provide an improved gas turbine engine thrust control system which adjusts the thrust output of the engine as it ages in order to maintain a substantially fixed relationship between the thrust output and the demanded thrust level.

It is another object of the present invention to provide such a thrust control system which automatically trims each individual engine to the lowest possible operating engine thrust level consistent with the rated engine thrust level.

It is a further object of the present invention to provide such a thrust control system which allows for lower design temperature margins, thereby increasing engine life.

It is yet another object of the present invention to provide such a thrust control system with built-in redundancy for increased operational safety.

SUMMARY OF THE INVENTION

Briefly stated, these objects, as well as additional objects and advantages, which will become apparent from the following detailed description and the appended drawings and claims, are accomplished by the present invention. The invention provides for a thrust-setting system that uses a plurality of thrust-indicating engine parameters to calculate a corresponding plurality of error signals relating to a difference between desired engine thrust and actual engine thrust. These error signals are then transformed through various means into a fuel flow error signal that ultimately sets a desired engine thrust level. In a preferred embodiment, the invention comprises a first means associated with a first thrust-indicating engine parameter for providing a first error signal related to a difference beetween desired thrust and actual thrust, and a second means associated with a second thrust-indicating engine parameter for providing a second error signal related to a difference between desired thrust and actual thrust. Third means are provided that is responsive to said first and second error signals for varying thrust output of the engine to correspond to a demanded level. The improvement of the present invention comprises fourth means for adjusting the thrust output of the engine as it ages in order to maintain a substantially fixed relationship between thrust output of the engine and demanded thrust level, usually determined by throttle position, over the operational life of the engine. In a preferred form, this fourth means is a trim function that ultimately controls a fuel-flow valve to maintain actual engine thrust at the thrust demand level without exceeding the demand level or rated thrust. The trim function thereby prevents excessive thrust production, thus avoiding excessive engine temperatures or excessive engine wear.

DESCRIPTION OF THE DRAWINGS

FIG. 1 is a block diagram representative of the improved thrust control system of a preferred embodiment of the present invention.

FIG. 2 is a more detailed block diagram representative of the trim computer of FIG. 1.

DESCRIPTION OF THE PREFERRED EMBODIMENT

Referring now to FIG. 1, a schematic block diagram of the improved thrust-setting system, shown generally at 20, is depicted. Gas turbine engine 22 includes appropriate sensors (not shown) for sensing operating parameters within the engine which are indicative of the level of thrust generated by the engine. While a number of operating conditions may be indicative of the level of thrust, for the purposes of this description and by way of example, fan speed (N) and engine temperature (T) (such as low pressure turbine inlet or discharge temperature) have been selected as appropriate. Fan speed signal (ACTUAL N) representative of actual fan speed is transmitted by electrical conductor 24 from the sensor in engine 22 to fan speed adder 26, which also receives a fan speed demand signal (DEMAND N) via electrical conductor 28 from fan speed demand reference computer 30. Fan speed demand computer 30 receives a plurality of input signals, namely by way of example, throttle position angle $\alpha$, engine total inlet temperature ($T_{t2}$) and engine total inlet pressure ($P_{t2}$) from which the fan speed demanded by the position of the throttle DEMAND N is calculated. Adder 26 compares the fan speed DEMAND N required by the pilot of the aircraft with the actual fan speed ACTUAL of gas turbine engine 22 and provides an error signal ($\Delta N$) which is indicative of the difference of the actual fan speed from that demanded by the throttle position. More specifically, error signal $\Delta N$ is indicative of the deviation of thrust-indicating parameter ACTUAL N from the generated fan speed reference value DE- MAND N. The error signal $\Delta N$ is transmitted via electrical conductor 32 to trim computer 50.

Actual engine temperature (ACTUAL T) is transmitted by electrical conductor 38 from engine 22 to an engine temperature adder 40, which also receives an engine temperature demand signal (DEMAND T) via electrical conductor 42 from an engine temperature demand reference computer 44. Computer 44 receives a plurality of input signals similar to those received by computer 30 and calculates the engine temperature demand (DEMAND T) required by the throttle setting in the aircraft. Adder 40 compares the engine demand temperature, DEMAND T, required by the pilot, with the actual engine temperature, ACTUAL T, and provides an engine temperature error signal, $\Delta T$. Error signal $\Delta T$ is indicative of the deviation of the temperature-indicating parameter ACTUAL T from the computed engine temperature reference value DEMAND T. Error signal $\Delta T$ is transmitted via electrical conductor 46 to the trim computer 50.

The trim computer 50 receives the fan speed error signal $\Delta N$ and the engine temperature error signal $\Delta T$, and in a manner hereinafter to be described, the trim computer 50 provides an output signal $\Delta TP$ which, after passing through an integrator 56 via conductor 58, is provided to engine 22 as fuel flow error signal $\Delta Wf$. The fuel flow error signal $\Delta Wf$ causes a fuel flow control valve (not shown) to open (if positive) or to close (if negative) in order to drive the thrust parameter error $\Delta TP$ to 0. When $\Delta TP$ is equal to 0, the engine 22 is operating in the steady-state condition.

Referring now to the embodiment shown in FIG. 2, a schematic block diagram of the trim computer 50 of FIG. 1 is depicted. This trim computer 50 is a principal component of the subject invention and represents a self-compensating dual control system which will maintain a substantially fixed relationship between actual thrust output and demanded thrust level as the engine deteriorates. The trim computer is a primary thrust-setting device for assuring rated thrust when both fan speed and temperature signals are available from the engine. In addition, automatic secondary thrust-setting modes are used by the trim computer when, for example, either the fan speed signal or the temperature signal is not available thereby automatically compensating for a loss of a signal from a temperature or fan speed sensing device. These and other functions of the trim computer, and their effect on control of the engine, will now be set forth in greater detail.

Referring again to FIG. 2, the temperature error signal $\Delta T$ is transmitted an electrical conductor 46 to a summing junction 60. Similarly, the fan speed error signal, $\Delta N$, is transmitted on electrical conductor 32 into the trim computer, but the fan speed error signal is multiplied by a parameter "K" at multiplier 62 and is then transmitted to the summing junction 60. The parameter "K," by which the fan speed error signal $\Delta N$ is multiplied, represents the rate of change of temperature with respect to fan speed along an engine throttle line and is a characteristic of the engine. Thus, after fan speed error signal is multiplied by the K parameter, the resultant fan speed error signal $K\Delta N$ is closely comparable to the temperature error signal $\Delta T$ as an indication of the difference between actual thrust and demanded thrust.

The summing junction 60 subtracts the resultant fan speed error signal ($K\Delta N$) from the temperature error signal ($\Delta T$) to determine $\Delta Y$ which will be used by the trim computer as an engine health indicator. $\Delta Y$ provides an indication of engine health because engine quality in the lower allowable range of manufacturing quality and progressive engine deterioration result in an increase in engine thrust at a given engine speed combined with a substantially greater increase in engine temperature. Reduced engine health due to such lower range of engine quality and increased engine deterioration will, therefore, result in an increase in the engine health indicator $\Delta Y$ relative to the average new engine. The summing junction 60 transmits the value of $\Delta Y$ (the calculation of $\Delta T - K\Delta N$) into a limiter 64 which products a $\Delta Y$ output signal within a range that is equal to or greater than $\Delta Y$ min and less than or equal to $\Delta Y$ max. A measured value of $\Delta Y$ between these preselected minimum and maximum limits would imply that engine health is within normal, acceptable limits, and that both the fan speed sensor and the temperature sensor are functioning properly. If, however, either one of the engine sensing units is not working properly or is sending no signal at all, the value of $\Delta Y$ will be beyond the range which the limiter will accept, causing the limiter to substitute for the value of $\Delta Y$, either $\Delta Y$ min or $\Delta Y$ max, whichever is appropriate.

The output signal of the limiter 64 is transmitted to summing junctions 66 and 68. The $\Delta Y$ signal is subtracted from $\Delta T$ at summing junction 68 and is transmitted to a selector 70 where it is compared to the original $K\Delta N$ signal from the multiplier 62. The larger of the two signals is retained and transmitted to a summing junction 80. In similar fashion, the $\Delta Y$ signal is added to the $K\Delta N$ signal at summing junction 66, transmitted to selector 72, and compared with the original temperature error signal from electrical conductor 46. Again, the greater of the two signals is retained and transmitted to a summing junction 82. The selectors 70 and 72 select the maximum value for the purpose of preventing the trim computer from considering or using a signal from a nonfunctioning engine sensor, as will be more fully described later in this description.

The $\Delta Y$ signal from the limiter 64 is also transmitted to function generators 74 and 76, or similar devices well known to those skilled in the art for determining trim schedule requirements, such as cams, micro-processors, or similar devices. The function generarators 74 and 76 provide trim corrections to nominal average engine speed and temperature demand schedules which will modify the nominal schedules to reflect an individual engine's manufacturing and assembly quality, its engine sensor errors, and the current level of deterioration present in the engine. The function generators provide an engine fan speed correction ($\Delta N_t$) and a corresponding engine temperature correction ($\Delta T_t$) which are functions of the engine health indicator $\Delta Y$ and which will provide a very high level, for example 98.5%, statistical probability of meeting engine rated thrust over the nominal operating life of the engine. This is accomplished by deriving the trim schedules from observed thrust and temperature variations of actual operating engines at constant fan speed and corresponds to a bivariate normal distribution of two standard deviations ($2\sigma$) with espect to the average engine. The temperature trim requirement $\Delta T_t$ is determined by trim function generator 76 as a function of $\Delta Y$, and $\Delta T_t$ is transmitted to an adder 82 where it is subtracted from the temperature error $\Delta T$. The resulting value is then transmitted to summing junction 84. Similarly, the speed trim requirement $\Delta N_t$ is determined by function generator 74 as a function of $\Delta Y$. The signal is multiplied by K at multiplier 78, and the resulting value of $K\Delta N_t$ is transmitted to adder 80 where it is subtracted from the speed error $K\Delta N$. Again, the resulting value is transmitted to the summing junction 84. The modified speed and temperature error signals are then combined at the summing junction 84 and divided by a factor of 2K at multiplier 86. A resulting thrust parameter error signal, $\Delta TP$, is transmitted to the integrator 56 (shown in FIG. 1) to drive the fuel control valve that controls the fuel flow in the engine 22.

OPERATION IN THE FIRST MODE

The operation of the aforementioned apparatus in a first mode of operation will now be disclosed. The control system will operate in the first mode when the sensors and circuitry associated with both thrust-indicating parameters are operating normally. In the event the pilot of the aircraft desires to change the thrust output of the engine 22, he will select a new throttle position. Since, as earlier described, a direct thrust measurement is impractical to obtain, the control system described above is based upon thrust-indicating parameters and more specifically, the pair of thrust-indicating parameters, fan speed, ACTUAL N, and engine temperature, ACTUAL T. The new throttle position designated as $\alpha$ will be received by both the speed reference computer 30 and the temperature reference computer 44, whereupon a new fan speed reference signal, DEMAND N, and engine temperature signal, DEMAND T, will be generated by computers 30 and 44, respectively. Since the actual fan speed and actual engine temperature have not yet been modified to reflect the change in throttle position made by the pilot, adders 26 and 40 provide fan speed error signal, $\Delta N$, and temperature error signal, $\Delta T$, which indicates that actual fan speed and actual engine temperature are not in accordance with their respective reference values. The $\Delta N$ reference signal is multiplied by the factor K by multiplier 62, shown in FIG. 2, and fed into summing junction 60, which also receives temperature error signal $\Delta T$. In the event that both engine parameter sensors are working properly, the magnitude of the difference signal, $\Delta Y$, which is equal to $\Delta T-K\Delta N$, should be in a band between $\Delta Y$ max and $\Delta Y$ min. If this is the case, then limiter 64 will provide an output $\Delta Y$ signal which is identical to the input signal $\Delta T-K\Delta N$ obtained from adder 60. Adder 66 will then provide an output signal equal to $(K\Delta N)+(\Delta T-K\Delta N)$ which will be equal to the original temperature error signal $\Delta T$ and this will be transmitted to the selector 72. Conversely, adder 68 will provide an output signal equal to $\Delta T-(\Delta T-K\Delta N)$ which will be equal to the original speed error signal $K\Delta N$ and this will be transmitted to selector 70.

It is readily observed that when the dual parameter thrust control system, comprising the present invention, is in the first mode of operation and the signal $\Delta Y$ is within the range of magnitudes bounded by $\Delta Y$ min and $\Delta Y$ max, the relationship given above for $\Delta Y$ will cause the selectors 70 and 72 to pass the actual fan speed error signal $K\Delta N$ and the actual temperature error signal $\Delta T$ for the purpose of calculating the change in fuel flow required to provide the desired amount of thrust. This is desirable because when both sensors are operating properly and the fan speed error and temperature error signals are within their normal operating ranges, it is desirable to employ both engine parameters in the thrust-setting system in order to achieve rated engine thrust at the lowest possible temperature.

The remaining operations follow multiplier 78, the same procedure described earlier through the function generators 74 and 76, the adders 80, 82, and 84, and the multiplier 86 to provide a thrust parameter error signal $\Delta TP$. In this first mode of operation, the value of $\Delta Y$ that is used by the function generators is a direct indication of engine health. Consequently, the calculated trim requirements $\Delta T_t$ and $\Delta N_t$ will provide the proper signals for modifying the thrust-setting error signals in order to accurately correct for the effects of engine quality and deterioration. It is contemplated that the thrust-setting system will operate in this first mode for the majority of the engine's operating life. In this manner, the first mode of operation results in a gradual reduction in engine fan speed at an engine set-point as the engine health indicator increases with increased engine deterioration over its operating life.

OPERATION IN THE SECOND MODE

In the event that the circuitry or sensors associated with any of the thrust-indicating parameters becomes inoperative or abnormally operative, the present invention provides for thrust management in a second mode by use of the remaining thrust-indicating parameter in the following manner. By way of example, assume the engine temperature sensor has malfunctioned so that the value of ACTUAL T transmitted on electrical conductor 38, shown in FIG. 1, is very low or nonexistent. Engine temperature adder 40 will then subtract the DEMAND T signal and will produce a relatively large negative number for the temperature error signal $\Delta T$. Summing junction 60 will produce a corresponding large negative number for the engine health indicator $\Delta T=\Delta T-K\Delta N$ that will be less than the minimum value $\Delta Y$ min. Limiter 64 will replace the calculated $\Delta Y$ signal by $\Delta Y$ min which will be transmitted to adders 66 and 68. Adder 66 will add the $K\Delta N$ signal to $\Delta Y$ min to produce a revised temperature error signal equal to $K\Delta N+\Delta Y$ min which will be transmitted to the selector 72. Selector 72 will compare the original temperature error signal (a negative value) from adder 40 with the revised temperature error signal (a positive value) from adder 66 and will pass the revised signal because it is the higher of the two values. Similarly, adder 68 will subtract the $\Delta Y$ min signal from the temperature error signal $\Delta T$ to produce a revised speed error signal equal to $\Delta T-\Delta Y$ min (a relatively large negative value) which will be transmitted to selector 70. Selector 70 will compare the original speed error signal $K\Delta N$ from multiplier 62 with the revised speed error signal from adder 68 and will retain the actual speed error signal from multiplier 62; again, because it is higher in value. Selectors 70 and 72 will transmit the actual speed error signal $K\Delta N$ and the revised temperature error signal $K\Delta N+\Delta Y$ min. The remaining operations follow the same procedure described earlier to provide the thrust parameter error signal. The failure of the temperature sensor or other loss of an actual temperature signal ACTUAL T results in the use of the actual speed signal and a computed temperature signal in the thrust-setting process. The computed temperature signal is derived from the actual speed signal and represents the minimum temperature normally anticipated at that speed.

Conversely, if the fan speed signal, ACTUAL N, is not available, the speed error signal ($\Delta N$) will be a large negative number which will produce a $\Delta Y$ that is greater than the established maximum value ($\Delta Y_{max}$). The limiter 64 will then replace the value of $\Delta Y$ with $\Delta Y$ max and transmit $\Delta Y$ max to the adders 66 and 68. With the same procedure as described above, this invention will then recalculate the fan speed error from the available temperature error and the maximum value of the engine health indicator to arrive at a revised value for engine fan speed of $K\Delta N = \Delta T - \Delta Y$ max. This resulting computed speed signal represents the minimum speed normally anticipated at the actual measured temperature.

It can, therefore, be appreciated that this second mode of operation uses either the actual fan speed error signal $K\Delta N$ or the actual temperature error signal $\Delta T$ in the thrust-setting process when the sensors or circuitry associated with the other thrust-indicating parameter have failed or are malfunctioning.

The invention is also capable of appropriately limiting the operational effect of the function generators 74 and 76 in this second mode of operation. The output of limiter 64 will be either the minimum value of the engine health indicator $\Delta Y$ min or the maximum value of the engine health indicator $\Delta Y$ max in the second mode. If the temperature signal is not available, then limiter 64 will transmit a value of $\Delta Y = \Delta Y$ min to function generators 74 and 76 which would be the equivalent of a maximum quality new engine. Function generator 74 would produce the maximum permissible fan speed correction which would be used as the basis for establishing an engine set-point. Conversely, if the fan speed signal is not available, then limiter 64 will transmit a value of $\Delta Y = \Delta Y$ max to function generators 74 and 76 which would be the equivalent of a minimum quality fully deteriorated engine. Function generator 76 would produce the maximum permisslbe temperature correction which would then be used as the basis for establishing the engine set-point. The present invention, therefore, functions as a limited-authority system which would limit the maximum temperature trim correction if the speed signal is not available and would limit the maximum speed trim correction if the temperature signal is not available. In this manner, the thrust-setting system is reasonably well isolated from the effects of abnormal operation of the sensors or the circuitry associated with either of the thrust-indicating parameters.

From the aforegoing description, it can be seen that the present invention provides a thrust-setting system having a redundant capability. The primary or first mode is presented wherein a pair of thrust-indicating parameters are utilized to set engine thrust. The secondary thrust-setting mode is available wherein one of the pair of thrust-indicating parameters is used to set thrust when the sensors or circuitry associated with the other of the pair is operating abnormally or is inoperative. The present invention additionally incorporates a means and a method by which the thrust control of the engine incorporates features which compensate for engine deterioration, differences in engine quality, and engine sensor errors.

Although the present invention has been described in terms of its preferred embodiments, it will be apparent to those skilled in the art that changes and modifications thereof may be made without departing from the scope of the appended claims which define the present invention.

Having described the invention, what is claimed as novel and desired to be secured by Letters Patent of the United States is:

1. An improved thrust control system for controlling thrust output of a gas turbine engine over its operational life comprising:
   first means for determining a first error signal indicative of any deviation of a first thrust-indicating engine operating parameter from a first reference value;
   second means for determining a second error signal indicative of any deviation of a second thrust-indicating engine operating parameter from a second reference value;
   third means for scheduling at least one trim signal proportional to both any deviation in magnitude between said first and second error signals, and any deviation in magnitude between observed thrust outputs of actual operating engines and the thrust outputs of a nominal engine, and effective for compensating for any deviation in thrust output of said engine from the thrust output of said nominal engine; and
   fourth means for combining said first and second error signals and said at least one trim signal and generating a thrust parameter error signal for controlling the thrust output of said engine whereby a substantially fixed relationship between the thrust output and the demanded thrust level over the operational life of the engine is maintained.

2. The invention as recited in claim 1, wherein said fourth means generates a fuel flow error signal as the thrust parameter error signal for controlling the amount of fuel metered through a fuel flow control valve for controlling the thrust output of said engine.

3. An improved thrust control system for controlling thrust output of a gas turbine engine over its operational life comprising:
   first means for determining a first error signal indicative of any deviation of a first thrust-indicating engine operating parameter from a first reference value;
   second means for determining a second error signal indicative of any deviation of a second thrust-indicating engine operating parameter from a second reference value; and
   third means effective for comparing said first and second error signals and providing an indicating signal in a first mode wherein said first and second means are in a normal operating condition and wherein said indicating signal is indicative of said first and second error signals, said third means being further effective for providing an indicating signal in a second mode when one of said first or second means is in an abnormal operating condition and wherein said indicating signal is indicative of whichever means is in a normal operating condition;
   fourth means responsive to said indicating signal from said third means and effective for scheduling at least one trim signal for the purpose of modifying said first and second error signals to compensate for any change in thrust output of said engine as it ages in order to maintain a substatially fixed relationship between the thrust output and a demanded thrust level over the operational life of the engine; and
   fifth means responsive to said indicating signal from said third means and effective for combining in said first mode said at least one trim signal and said first and second error signals, and for combining in said second mode said at least one trim signal, the error signal from the first or second means when in said normal operating condition thereof, and a scheduled error signal for the first or second means when in said abnormal operating condition for providing a fuel flow error signal effective for controlling the amount of fuel metered through a fuel flow control valve for thereby adjusting the thrust output of said engine to correspond to the demanded thrust level.

4. The invention as recited in claim 3, wherein said fourth means comprises:

a first function generator responsive to said indicating signal from said third means and effective for providing a first trim signal for modifying said first error signal;

a second function generator responsive to said indicating signal from said third means and effective for providing a second trim signal for modifying said second error signal;

and wherein said fifth means is effective in said first mode for combining said first and second error signals, and both said first and second trim signals in providing said fuel flow error signal.

5. The invention as recited in claims 3 or 4, wherein said third means is effective for providing an indicating signal proportional to any difference between the magnitudes of said first and second error signals and which indicating signal is in said first mode indicative of both said first and second error signals when said difference is within a predetermined range of reference signal values, and is further effective for providing said indicating signal in said second mode indicative of a scheduled error signal when said difference is outside said predetermined range of reference signal values.

6. The invention as recited in claim 4, wherein said function generators are responsive to said indicating signal from said third means and each scheduling a trim signal proportional to both any deviation in magnitude between said first and second error signals, and any deviation between observed thrust outputs of actual operating engines and the thrust outputs of a nominal engine and reflecting individual engine differences in manufacturing and assembly quality, engine sensor errors and engine deterioration over the operational life of the engine.

7. The invention as recited in claims 1 or 3, wherein said first means determines a first error signal representative of a difference between actual fan speed and a demand level fan speed, and wherein said second means determines a second error signal representative of a difference between actual engine temperature and a demand level engine temperature.

8. A method of setting the thrust output of a gas turbine engine over its operational life comprising the steps of:

measuring a first thrust-indicating engine operating parameter;

comparing the first measured parameter value with a first reference value to determine a first error signal;

measuring a second thrust-indicating engine operating parameter;

comparing the second measured paramater value with a second reference value to determine a second error signal;

scheduling at least one trim signal proportional to both any deviation in magnitude between said first and second error signals, and any deviation in magnitude between observed thrust outputs of actual operating engines and thrust outputs of a nominal engine, and effective for compensating for any deviation in thrust output of said engine from the thrust output of said nominal engine; and metering engine fuel flow in response to said first error signal, said second error signal, and said trim signal for the purpose of adjusting the thrust output of said engine whereby a substantially fixed relationship between the thrust output and demand thrust level over the operational life of the engine is maintained.

9. An improved thrust control system for controlling thrust output of a gas turbine engine over its operational life comprising:

a plurality of means for determining a plurality of error signals indicative of a plurality of deviations of thrust-indicating engine operating parameters from a plurality of reference values;

means for scheduling at least one trim signal proportional to both any deviation in magnitude between at least two of said plurality of error signals, and any deviation in magnitude between observed thrust outputs of actual operating engines and thrust outputs of a nominal engine, and effective for compensating for any deviation in thrust output of said engine from the thrust output of said nominal engine; and means effective for adjusting the thrust output of said engine in response to both said plurality of error signals and said at least one trim signal whereby a substantially fixed relationship between the thrust output and the demanded thrust level over the operational life of the engine is maintained.

* * * * *